(12) United States Patent
Ji et al.

(10) Patent No.: US 11,919,536 B2
(45) Date of Patent: Mar. 5, 2024

(54) EVALUATION METHOD AND SYSTEM FOR STEERING COMFORT IN HUMAN MACHINE COOPERATIVE TAKE-OVER CONTROL PROCESS OF AUTONOMOUS VEHICLE, AND STORAGE MEDIUM

(71) Applicant: Tsinghua University, Beijing (CN)

(72) Inventors: Xuewu Ji, Beijing (CN); Yuan Chu, Beijing (CN)

(73) Assignee: Tsinghua University, Beijing (CN)

( * ) Notice: Subject to any disclaimer, the term of this patent is extended or adjusted under 35 U.S.C. 154(b) by 150 days.

(21) Appl. No.: 17/353,264

(22) Filed: Jun. 21, 2021

(65) Prior Publication Data
US 2021/0394789 A1 Dec. 23, 2021

(30) Foreign Application Priority Data
Jun. 20, 2020 (CN) .......................... 202010571380.X

(51) Int. Cl.
*B60W 60/00* (2020.01)
*B60W 40/08* (2012.01)
*G06N 7/01* (2023.01)

(52) U.S. Cl.
CPC ........ *B60W 60/0013* (2020.02); *B60W 40/08* (2013.01); *B60W 60/0015* (2020.02);
(Continued)

(58) Field of Classification Search
None
See application file for complete search history.

(56) References Cited

U.S. PATENT DOCUMENTS

| 2015/0120336 A1* | 4/2015 | Grokop | .................. | G06Q 40/08 |
| | | | | 705/4 |
| 2016/0001781 A1* | 1/2016 | Fung | ....................... | G07C 9/37 |
| | | | | 701/36 |

(Continued)

FOREIGN PATENT DOCUMENTS

| CN | 103278341 A | 9/2013 |
| CN | 108742610 A | 11/2018 |

OTHER PUBLICATIONS

Machine Translation of CN 111861128 corresponding to CN 202010571380, WIPO, all. (Year: 2020).*

(Continued)

*Primary Examiner* — James J Lee
*Assistant Examiner* — Andrew Sang Kim
(74) *Attorney, Agent, or Firm* — Morse, Barnes-Brown & Pendleton, P.C.; Martin Z. Zhang, Esq.

(57) ABSTRACT

The present disclosure relates to an evaluation method and system for steering comfort in a human machine cooperative take-over control process of an autonomous vehicle, and a storage medium, thereby avoiding a defect that most comfort evaluation methods are applicable only in laboratory conditions, and also solving a problem that most comfort evaluation methods do not consider non-traditional control characteristics of a driver in a take-over control process. The method of the present disclosure includes: acquiring vehicle data information in a current driving cycle, and preprocessing the vehicle data information to form preprocessed vehicle data information; and using the preprocessed vehicle data information as an input to a well-trained comfort model library, and performing log probability matching calculation on the basis of the comfort model library, to form a comfort recognition result corresponding to comfort.

8 Claims, 4 Drawing Sheets

(52) U.S. Cl.
CPC .... *B60W 60/0053* (2020.02); *B60W 60/0059* (2020.02); *G06N 7/01* (2023.01); *B60W 2540/223* (2020.02)

(56) References Cited

U.S. PATENT DOCUMENTS

| | | | |
|---|---|---|---|
| 2018/0170372 A1* | 6/2018 | Takamatsu | G08G 1/0145 |
| 2018/0275667 A1* | 9/2018 | Liu | B60W 50/029 |
| 2019/0171204 A1* | 6/2019 | Jang | B60W 30/182 |
| 2019/0202466 A1* | 7/2019 | Hu | B60W 50/0098 |
| 2019/0283769 A1* | 9/2019 | Chiba | B60W 60/0055 |
| 2020/0406906 A1* | 12/2020 | Omari | G05D 1/0221 |
| 2021/0061298 A1* | 3/2021 | Balachandran | A61B 5/4266 |
| 2021/0165409 A1* | 6/2021 | Berntorp | G05D 1/0214 |
| 2021/0300419 A1* | 9/2021 | Matsunaga | G06V 20/56 |
| 2022/0274608 A1* | 9/2022 | Fujii | A61B 5/18 |

OTHER PUBLICATIONS

SAE International "Surface Vehicle Recommended Practice" pp. 1-35, 2018.

\* cited by examiner

EVALUATION METHOD AND SYSTEM FOR STEERING COMFORT IN HUMAN MACHINE COOPERATIVE TAKE-OVER CONTROL PROCESS OF AUTONOMOUS VEHICLE, AND STORAGE MEDIUM

CROSS REFERENCE TO RELATED APPLICATION(S)

This patent application claims the benefit and priority of Chinese Patent Application No. 202010571380.X, filed on Jun. 20, 2020, the disclosure of which is incorporated by reference herein in its entirety as part of the present application.

TECHNICAL FIELD

The present disclosure relates to the technical field of automotive ergonomics, and in particular to an evaluation method and system for steering comfort in a human machine cooperative take-over control process of an autonomous vehicle, and a storage medium.

BACKGROUND ART

With the development of modern society, automobiles are no longer just a simple means of transport. People have increasingly high requirements for automotive comfort performance, and automotive comfort design will become more important like automotive functional design and aesthetic design. Steering comfort of a vehicle is an important indicator of steering handling performance of the vehicle. A vehicle with excellent steering comfort can not only improve driving experience, but also reduce misoperations caused by steering discomfort, thereby reducing driving risks.

At present, researches on steering comfort of motor vehicles (in which a steering wheel is a main human machine steering interactive interface) are mainly aimed at different research targets, and are completed by establishing a mapping relationship between a target quantity and subjective cognition of a subject. The subjective cognition is quantified by evaluation scores and constrained by different evaluation criteria. Generally, different regions or companies have different subjective evaluation standards (such as the SAE J1441 and J1060 standards in the United States, the German Bell rating method, and the Japanese seven-point rating system), and thus subjective evaluation scores have certain subjectivity and differences. In terms of evaluation data analysis, histograms, boxplots, and p-value and f-value test methods in statistical analysis methods, and the analytic hierarchy process (AHP) in operations research are often used to analyze data characteristics of steering comfort of a driver; a covariance, a covariance matrix, a correlation coefficient, and a multiple regression equation are used to calculate and analyze the correlation between different target quantities; and mathematical models such as a loss function and an evaluation formula are built to calculate the quantitative impact of the target quantities on comfort.

In addition, according to research directions, existing steering comfort technologies can be classified in two main research directions: posture comfort and handling comfort.

In researches on posture comfort, the main consideration is the impact of a driving environment in a vehicle on the body posture of a driver in a steering process, involving parameters of a human machine interaction device (such as contact surface texture, a spatial position, and a horizontal inclination of a steering wheel, and a backrest angle and height of the drivers seat) and the drivers posture characteristics (which can be classified into a static posture and a dynamic posture, where the static posture may include comfort angles of main joints of the driver's upper limbs such as elbow joints and shoulder joints, and the dynamic posture may include limit positions of the limbs during a steering operation). Considering that there is a direct relationship between steering comfort evaluation and limb movement of a driver, in addition to using a vehicle system and limb states as research variables, the existing researches also use human physiological data (electromyographic signals, electrocardiosignals, and electroencephalogram signals) as target quantities to establish an objective evaluation method for steering comfort.

For example, the application No. CN108742610A discloses a steering comfort evaluation method for implementing an association between myoelectricity and subjectiveness. First, main active muscles of the neck and upper back of a driver subject when the driver turns the head and an active muscle of the shoulder of the driver when the driver turns the steering wheel are selected as muscles to be tested, and a multi-channel electromyography (EMG) signal physiological test recorder is used as a signal collection device, to measure EMG information of each muscle when each subject performs a steering action. Second, the driver subject scores in a subjective evaluation form. Then, root-mean-square processing is performed on and weights are set for collected EMG signals, and subjective scores of driver subjects are normalized. Finally, a correspondence model between the physiological information and the subjective evaluation is constructed.

In researches on handling comfort, the main focus is on the observation and analysis of changes in vehicle dynamics parameters (such as a yaw rate, lateral acceleration, and other parameters) and characteristics of a drivers input (such as a steering force or a steering hand torque) to a vehicle system, and the human machine system design is gradually optimized based on scoring results.

For example, the grant announcement No. CN103278341B discloses an evaluation method for steering and handling comfort of an automobile driver, including an automobile driver kinematics and dynamics parameter test unit and a data processing and analysis unit, where the automobile driver kinematics and dynamics parameter test unit includes a three-dimensional adjustable driving cab simulation platform module, a steering wheel drag torque simulation module, a steering wheel angle and torque test module, and a kinematics test module; and the data processing and analysis unit includes data filtering, analysis, and comfort evaluation modules. According to the evaluation method for steering and handling comfort of an automobile driver in the system, the modules in the automobile driver kinematics and dynamics parameter test unit are used to collect kinematics and dynamics parameters of a driver subject, and the collected kinematics and dynamics parameters undergo filtering, analysis, and evaluation by the modules in the data processing and analysis unit, thereby completing the evaluation of steering and handling comfort of the automobile driver.

It can be clearly found that the existing steering comfort evaluation methods described above mainly have two characteristics: a human driving scenario; and non-online evaluation. The human driving scenario represents characteristics of the current mainstream (traditional) human machine steering interaction, that is, in a human driving environment, the basic element is that the driver's hands are always in contact with the steering wheel, and the basic feature is that the driver controls steering.

Regarding the human driving scenario, in the face of the current trend of vehicle intelligence development, especially in the face of the development of vehicle unmanned driving technology, the traditional steering comfort evaluation methods cannot well meet the needs of the development of autonomous vehicle systems. The main reason is that the autonomy of the autonomous driving system changes the human machine driving relationship, and the driver's operating behavior has changes from non-contact to contact.

The non-online evaluation means that the comfort evaluation method does not feature real-time calculation. The main reason is that such methods involve unique data collection requirements. For example, a comfort evaluation method based on EMG signals requires the use of an electromyography meter, and a sensor needs to be attached to the surface of the human skin during collection; a comfort evaluation method based on a limb posture requires the arrangement of cameras in different directions to capture driver's steering operation image data from different angles. Obviously, such evaluation methods are not applicable in daily driving conditions. Therefore, most comfort evaluation methods are applicable only to laboratory conditions to improve ergonomics design during vehicle development. Therefore, it is particularly important to develop an online evaluation method for steering comfort that is applicable to daily driving scenarios and meets requirements of a human machine cooperative steering process of an intelligent vehicle (a vehicle equipped with an autonomous driving system).

SUMMARY

In view of the shortcomings of the prior art, a first objective of the present disclosure is to provide an evaluation method for steering comfort in a human machine cooperative take-over control process of an autonomous vehicle, to perform comfort evaluation on driving comfort in a current driving cycle, thereby reducing take-over risks caused by poor steering comfort in a take-over process, and improving driving safety.

The above first objective of the present disclosure is achieved by means of the following technical solution:

An evaluation method for steering comfort in a human machine cooperative take-over control process of an autonomous vehicle is provided, including:
  acquiring vehicle data information collected by a control mechanism sensor and a vehicle sensor in a current driving cycle, and preprocessing the vehicle data information to form preprocessed vehicle data information; and
  using the preprocessed vehicle data information as an input to a well-trained comfort model library, and performing log probability matching calculation on the basis of the comfort model library, to form a comfort recognition result corresponding to comfort.

With the foregoing technical solution, the log probability matching calculation is performed on the basis of the well-trained comfort model library according to vehicle data information acquired in a corresponding driving cycle, so as to obtain the comfort recognition result in the current driving cycle, and achieve online comfort evaluation based on driving comfort in the current driving cycle. In other words, the evaluation can be based on comfort in actual driving conditions, instead of being limited to a test environment and device in a laboratory. The design of a human machine system is gradually optimized on the basis of scoring results, and it helps improve the safety of human machine interaction. Subjective evaluation results of a drivers comfort are converted into recognizable behavioral and cognitive characteristics of the driver, so as to implement a more humanized vehicle control strategy.

In a preferred example, the present disclosure may be further configured as follows: a preset driving cycle is a transition from an autonomous driving state to a take-over driving state.

In a preferred example, the present disclosure may be further configured as follows: the autonomous driving state is defined as a state that a driver is inside the autonomous vehicle and the limbs of the driver are not in contact with any vehicle motion control mechanism; and
  the take-over driving state is defined as a human machine cooperative control state that is formed by both an autonomous driving system and a driver who is inside the autonomous vehicle after the autonomous driving system sends a take-over request to the driver and before the vehicle motion control of the autonomous driving system fails.

With the foregoing technical solution, in order to make up for the shortcomings of the existing driver handling comfort objective evaluation methods in human machine cooperative driving scenarios, a mode different from traditional driving is fully considered, and comfort evaluation of the transition from the autonomous driving state to the take-over driving state is based on the experience of the driver in a process when the driver's limbs are in contact with a vehicle handling apparatus again to form effective control.

In a preferred example, the present disclosure may be further configured as follows: selecting a training data set of a comfort model, where the training data set includes subjective evaluation data information and the preprocessed vehicle data information, with the preprocessed vehicle data information being in a one-to-one correspondence with the subjective evaluation data information; and the subjective evaluation data information includes several comfort levels;
  describing the preprocessed vehicle data information using a Gaussian mixture model to form representation information, and associating the representation information with the subjective evaluation data information to form associated data information at different comfort levels;
  using the associated data information as an input to the comfort model for model training;
  in the process of training the comfort model, using different comfort levels as hidden states in the comfort model, and iteratively calculating parameters corresponding to the different comfort levels by using an expectation-maximization algorithm until convergence; and
  forming, according to different parameters that have been trained, comfort models corresponding to the different comfort levels, where a plurality of comfort models form the comfort model library.

With the foregoing technical solution, which is applicable to semi-autonomous driving, the model parameters that have been trained allow the model to have a data prediction capability, so as to obtain predicted values of subjective evaluation of a driver in a traditional human driving steering scenario; for the human machine cooperative take-over control process of the autonomous vehicle, vehicle data information of a human machine interaction control device is extracted, and a subjective evaluation questionnaire for handling comfort is designed according to specific requirements, and subjective evaluation data information of the driver is acquired, thereby forming a training data set for training mathematical model parameters with online calculation performance; and on the basis of a pattern recognition system having an excellent generalization ability and supporting online calculation, an online driver comfort recognition function in the human machine cooperative take-over control process is achieved, thereby improving the intelligence of the vehicle.

In a preferred example, the present disclosure may be further configured as follows: a method for selecting the subjective evaluation data information and the preprocessed vehicle data information in the training data set is as follows:

acquiring, according to the current driving cycle and a predesigned handling comfort evaluation questionnaire, subjective evaluation data information corresponding to a handling comfort evaluation survey in the current driving cycle, and sequentially recording, according to subjective evaluation data information acquired in different tests, the subjective evaluation data information as $D_{tv1}, D_{tv2}, \ldots, D_{tvm}$; and acquiring the vehicle data information collected by the control mechanism sensor and the vehicle sensor in the current driving cycle, and preprocessing the vehicle data information to form the preprocessed vehicle data information, and sequentially recording, according to preprocessed vehicle data information acquired in different tests, the preprocessed vehicle data information as $D_{td1}, D_{td2}, \ldots, D_{tdm}$, where subjective evaluation data information and preprocessed vehicle data information that are acquired in the same test are in a one-to-one correspondence, data $D_{tvm}$ and data $D_{tdm}$ constitute one sample denoted as $D_m$, and a number of the sample $D_m$ is $S_m$.

In a preferred example, the present disclosure may be further configured as follows: dividing the comfort into n comfort levels, with a comfort data group corresponding to a comfort level being defined as $L_n$; and retrieving, according to the sample number $S_m$ corresponding to the subjective evaluation data information $D_{tvm}$ in the current comfort data group $L_n$, the preprocessed vehicle data information $D_{tdm}$ corresponding to the sample number $S_m$, and allocating the preprocessed vehicle data information $D_{tdm}$ to the corresponding comfort data group $L_n$.

In a preferred example, the present disclosure may be further configured as follows: when a driving cycle of transitioning from the autonomous driving state to the take-over driving state occurs in a driving process, acquiring the subjective evaluation data information and the vehicle data information, and updating the acquired subjective evaluation data information and vehicle data information to the training data set as new training data.

With the foregoing technical solution, the vehicle data information and the subjective evaluation data information are made corresponding to each other to form a sample, which facilitates subsequent grouping and invocation and ensures that data selected and invoked is in a one-to-one correspondence, avoiding training data confusion that affects a final training result; in addition, the subjective evaluation data information and the vehicle data information acquired in the actual driving process are recorded and fed back, to facilitate updating to the training data set as new training data, and constantly replenish training data, ensuring that the final comfort evaluation result can match the conditions in the actual driving process.

In a preferred example, the present disclosure may be further configured as follows: the comfort model library includes a comfort state model and a non-comfort state model; and values of log probabilities of the comfort state model and the non-comfort state model are calculated according to a forward-backward algorithm, and the comfort recognition result is output according to the values of the log probabilities.

With the foregoing technical solution, the comfort model library is directly divided into two models, namely, the comfort state model and the non-comfort state model, which greatly simplifies the drivers evaluation process in the actual driving process and can effectively improve the drivers feedback efficiency and the safety of take-over operations.

A second objective of the present disclosure is to provide an evaluation system for steering comfort in a human machine cooperative take-over control process of an autonomous vehicle, to perform comfort evaluation on driving comfort in a current driving cycle, which helps improve driving safety.

The above second objective of the present disclosure is achieved by means of the following technical solution:

An evaluation system for steering comfort in a human machine cooperative take-over control process of an autonomous vehicle is provided, including:

a data acquisition module configured to acquire vehicle data information collected by a control mechanism sensor and a vehicle sensor in a current driving cycle;

a data preprocessing module configured to preprocess the vehicle data information to form preprocessed vehicle data information;

a comfort recognition module for using the preprocessed vehicle data information as an input to a well-trained comfort model library, and performing log probability matching calculation on the basis of the comfort model library, to form a comfort recognition result corresponding to comfort; and a model training module for selecting a training data set of a comfort model, where the training data set includes subjective evaluation data information and the preprocessed vehicle data information; describing the preprocessed vehicle data information using a Gaussian mixture model to form representation information, and associating the representation information with the subjective evaluation data information to form associated data information at different comfort levels; using the associated data information as an input to the comfort model for model training; in the process of training the comfort model, using different comfort levels as hidden states in the comfort model, and iteratively calculating parameters corresponding to the different comfort levels by using an expectation-maximization algorithm until convergence; and forming, according to different parameters that have been trained, comfort models corresponding to the different comfort levels, where a plurality of comfort models form the comfort model library.

A third objective of the present disclosure is to provide a computer-readable storage medium capable of storing a corresponding program, which helps implement comfort evaluation on driving comfort in a current driving cycle, and improve driving safety.

The above third objective of the present disclosure is achieved by means of the following technical solution:

A computer-readable storage medium is provided, including a program that, when loaded and executed by a processor, can implement the foregoing evaluation method for steering comfort in a human machine cooperative take-over control process of an autonomous vehicle.

In conclusion, the present disclosure includes the following beneficial technical effects: the current driving comfort can be evaluated online according to the acquired vehicle parameter data, which helps improve driving safety.

DETAILED DESCRIPTION OF THE EMBODIMENTS

Figure 1:
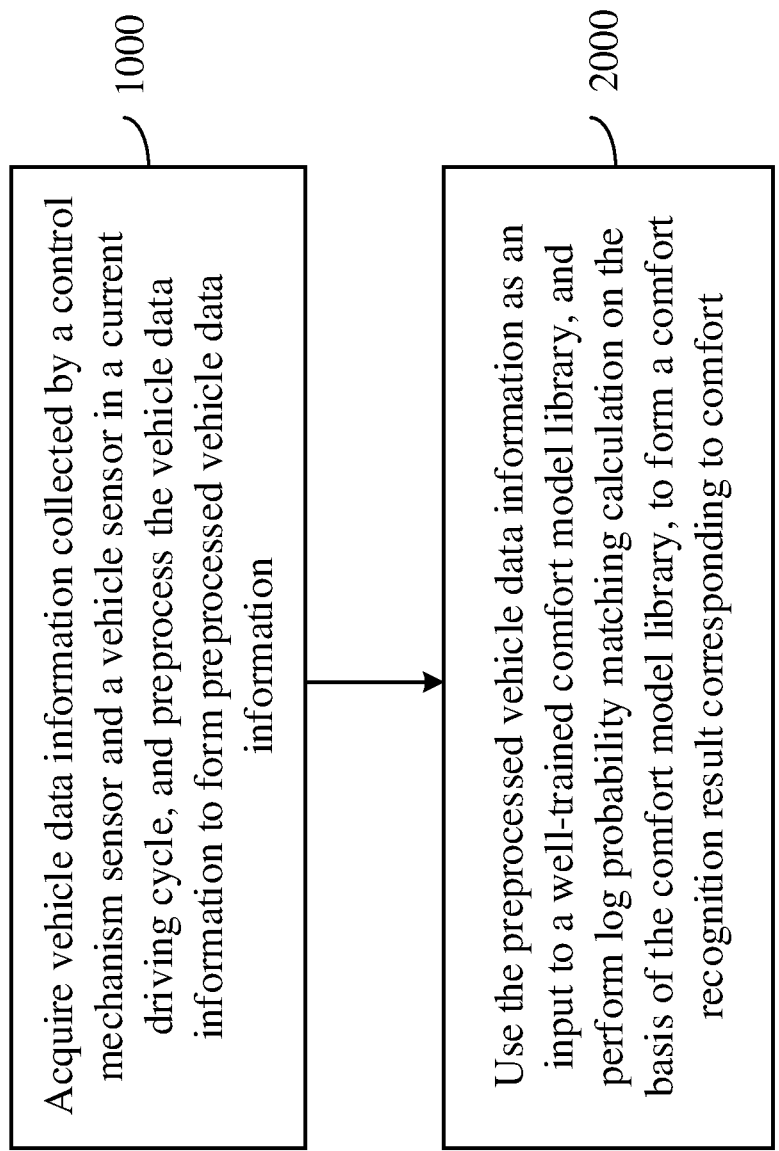
FIG. 1 is a schematic flowchart of an evaluation method for steering comfort in a human machine cooperative take-over control process of an autonomous vehicle.

The following further describes the present disclosure with reference to the accompanying drawings.

The embodiments are only explanations of the present disclosure, instead of a limitation to the present disclosure. After reading this specification, those skilled in the art can make modifications to the embodiments without creative contribution as needed. However, any modifications that fall within the scope of the present disclosure shall be protected by the patent law.

The embodiments of the present disclosure provide an evaluation method for steering comfort in a human machine cooperative take-over control process of an autonomous vehicle, including: acquiring vehicle data information collected by a control mechanism sensor and a vehicle sensor in a current driving cycle, and preprocessing the vehicle data information to form preprocessed vehicle data information; and using the preprocessed vehicle data information as an input to a well-trained comfort model library, and performing log probability matching calculation on the basis of the comfort model library, to form a comfort recognition result corresponding to comfort.

In the embodiments of the present disclosure, the log probability matching calculation is performed on the basis of the well-trained comfort model library according to vehicle data information acquired in a corresponding driving cycle, so as to obtain the comfort recognition result in the current driving cycle, and achieve online comfort evaluation based on driving comfort in the current driving cycle. In other words, the evaluation can be based on comfort in actual driving conditions, instead of being limited to a test environment and device in a laboratory. The design of a human machine system is gradually optimized on the basis of scoring results, and it helps improve the safety of driving. Subjective evaluation results of a driver's comfort are converted into recognizable behavioral and cognitive characteristics of the driver, so as to implement a more humanized vehicle control strategy.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the embodiments described are some rather than all of the embodiments of the present disclosure. All other embodiments derived by those of ordinary skill in the art on the basis of the embodiments in the present disclosure without creative efforts shall fall within the scope of protection of the present disclosure.

The term "and/or" used herein merely describes an association relationship between associated objects, and indicates that three types of relationships may exist. For example, A and/or B may indicate that A exists alone, both A and B exist, or B exists alone. In addition, unless otherwise specified, the character "/" used herein generally indicates that the associated objects are in an "or" relationship.

The embodiments of the present disclosure will be further described in detail with reference to the accompanying drawings of the specification.

An embodiment of the present disclosure provides an evaluation method for steering comfort in a human machine cooperative take-over control process of an autonomous vehicle, and main procedures of the method are described as follows.

Figure 4:
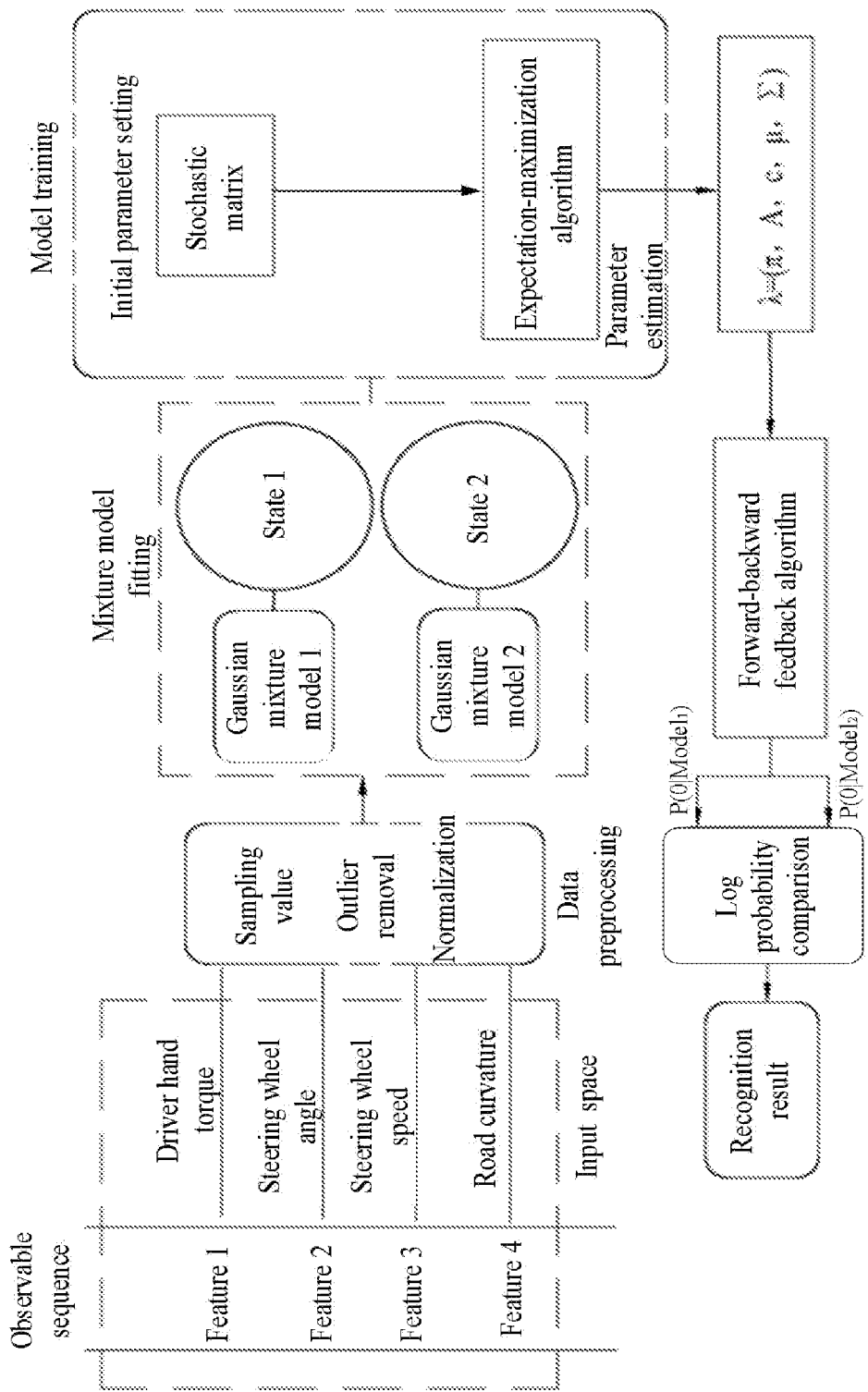
FIG. 4 is a schematic block diagram of an evaluation method for steering comfort in a human machine cooperative take-over control process of an autonomous vehicle.

As shown in FIGS. 1 and 4:

Step 1000: Acquire vehicle data information collected by a control mechanism sensor and a vehicle sensor in a current driving cycle, and preprocess the vehicle data information to form preprocessed vehicle data information.

There may be many types of driving cycles, such as an autonomous driving state, a human driving state, and a transition from an autonomous driving state to a take-over driving state. In this embodiment, the driving cycle refers to the transition from the autonomous driving state to the take-over driving state.

The autonomous driving state is defined as a state that a driver is inside the autonomous vehicle and the limbs of the driver are not in contact with any vehicle motion control mechanism; the human driving state is defined as a state that a driver is inside the driving vehicle and the limbs of the driver are in contact with a vehicle motion control mechanism to control the vehicle; and the take-over driving state is defined as a human machine cooperative control state that is formed by both an autonomous driving system and a driver who is inside the autonomous vehicle after the autonomous driving system sends a take-over request to the driver and before the vehicle motion control of the autonomous driving system fails.

Different from the concept of a driver of a traditional vehicle, the driver in the present application refers to an occupant in the vehicle who takes over a driving task. In an intelligent vehicle system having an autonomous driving system, a manipulation interface for vehicle motion control is not limited to the structure and position layout of a manipulator of the traditional vehicle.

The vehicle data information includes steering wheel angle data, steering wheel speed data obtained from differential steering wheel angle data, driver steering hand torque data, and collected road curvature information. The steering wheel angle data may be acquired by a steering wheel angle sensor. The steering wheel speed data may be calculated according to the steering wheel angle data, or may be acquired by an electromagnetic induction steering wheel speed sensor. The driver steering hand torque data may be acquired by a hand torque steering wheel sensor. The road curvature information may be acquired by a mobile eye device.

A process of preprocessing the vehicle data information specifically includes processing steps such as denoising, standardization, filling missing values, and outlier detection. Denoising can be done by using manual inspection, a statistical model, binning, clustering, regression, etc. Standardization can be done by using a min-max method (normalization method), a z-score method (standardization method), a normalization method, etc. Missing values can be filled by using a k-nearest neighbor imputation method, a locally weighted imputation method, an ordered nearest neighbor imputation method, a mean imputation method, a mode imputation method, a regression imputation method, a multiple imputation method (M-heuristic method), etc. Outlier detection can be done by using a Grubbs's test, a Dixon's test, or a 3t distribution test method.

Step 2000: Use the preprocessed vehicle data information as an input to a well-trained comfort model library, and perform log probability matching calculation on the basis of the comfort model library, to form a comfort recognition result corresponding to comfort.

The comfort model library includes a comfort state model and a non-comfort state model. Log probabilities of the comfort state model and the non-comfort state model are calculated, and the comfort recognition result is output according to values of the log probabilities. Log probabilities of different comfort models are calculated, and a larger log probability value indicates that a comfort model corresponding to its maximum value is more similar to the current comfort level of the driver. In this way, a prediction result of evaluation of upper limb comfort of the driver in a human machine cooperative steering process can be obtained, that is, a vehicle system can recognize a steering comfort state of the driver in a take-over process, thereby implementing evaluation of steering comfort in a human machine cooperative take-over control process of the autonomous vehicle.

The evaluation can be based on comfort in actual driving conditions. The design of a human machine system is gradually optimized on the basis of scoring results, and it helps improve the safety of driving. In this process, a well-trained comfort state model is of great significance.

Figure 2:
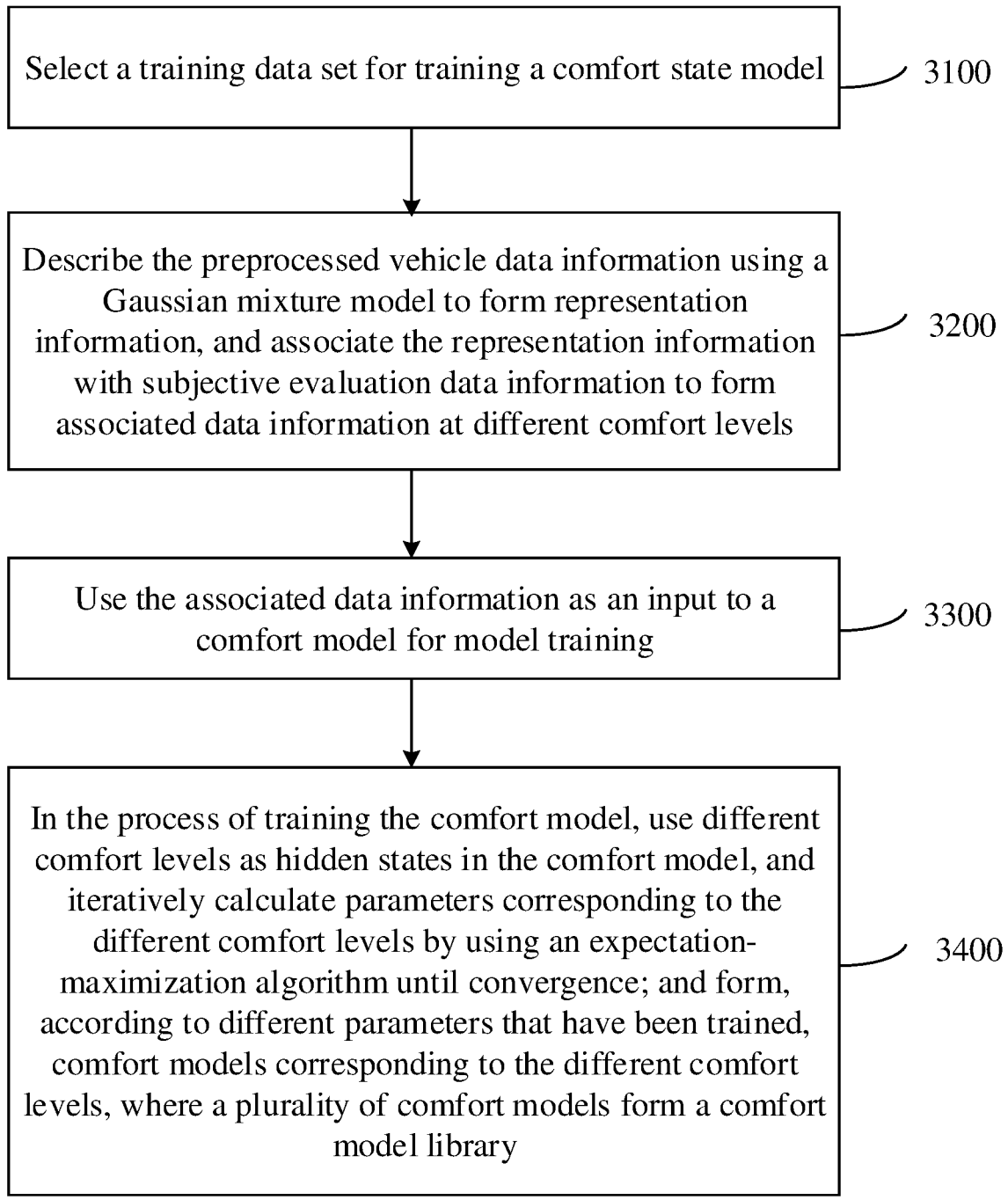
FIG. 2 is a schematic flowchart of a training process of a comfort state model.

As shown in FIGS. 2 and 4, a training process of the comfort state model is as follows:

Step 3100: Select a training data set for training the comfort state model.

The training data set includes subjective evaluation data information and the preprocessed vehicle data information. Subjective evaluation data information corresponding to a handling comfort evaluation survey in the current driving cycle is acquired according to the current driving cycle and a predesigned handling comfort evaluation questionnaire; and the vehicle data information collected by the control mechanism sensor and the vehicle sensor in the current driving cycle are acquired, and the vehicle data information is preprocessed to form the preprocessed vehicle data information.

A process of acquiring the subjective evaluation data information is as follows:

According to a specific research object of driver handling comfort, the design of the handling comfort evaluation questionnaire in the human machine cooperative take-over control process is completed based on the SAE J1441_201609 standard; and in the handling comfort evaluation questionnaire, a type of an event evaluated is designed as "driver upper limb comfort". In this event type, there are two evaluation indicators: steering controllability and disturbance torque.

The handling comfort refers to physiological and psychological cognition related to handling comfort states, such as direct sense of contact from a contact part, indirect sense of contact from a non-contact part, or a psychological state generated by the driver when the driver is in contact with the control mechanism for vehicle motion control to form vehicle driving control take-over. The subjective handling comfort evaluation questionnaire is a quantitative form that can map the driver's states about handling comfort. The form has a center boundary line for rating, which is used to distinguish the driver's "comfort" state from the "discomfort" state.

Details are as follows:

| Rating scale | | 10 | 9 | 8 | 7 | 6 | 5 | 4 | 3 | 2. | 1 |
|---|---|---|---|---|---|---|---|---|---|---|---|
| Driver upper limb comfort in the take-over driving state | Steering Controllability | Excellent | | Good | | Fair | Boundary line | Poor | | Very poor | Unacceptable |
| | Torque disturbance | Feel nothing | Describable | Little | Some | Moderate | | Annoying | Strong | Severe | |
| Comfort model | | | | Satisfied | | | | | | Unsatisfied | |

The actual subjective evaluation data information of the driver is acquired according to the above-mentioned handling comfort evaluation questionnaire.

A process of acquiring the vehicle data information is as follows:

The vehicle data information includes steering wheel angle data, steering wheel speed data obtained from differential steering wheel angle data, driver steering hand torque data, and collected road curvature information. The steering wheel angle data may be acquired by a steering wheel angle sensor. The steering wheel speed data may be calculated according to the steering wheel angle data, or may be acquired by an electromagnetic induction steering wheel speed sensor. The driver steering hand torque data may be acquired by a hand torque steering wheel sensor. The road curvature information may be acquired by the Labview software. Preprocessing the vehicle data information to form the preprocessed vehicle data information has been described in detail in step 1000, and therefore details will not be repeated herein. The collection of the vehicle data information is based on sensors of the vehicle. However, the development of vehicle sensors has some uncertainties. Therefore, there may be some brand new data signal types. In addition, some real-time signal collection devices that cannot be used in a daily driving process may be developed in recent years. For example, a more convenient and compact smart wearable device can collect physiological data of a human body to form a training data set.

In the process of acquiring the above subjective evaluation data information and vehicle data information, on the basis of a passenger vehicle steering simulator of the State Key Laboratory of Automotive Safety and Energy of Tsinghua University, a hardware-in-the-loop platform for an evaluation method for steering comfort in a human machine cooperative take-over control process is built, and a virtual vehicle and scene are built using the Car sim software on the computer of the platform; and an autonomous driving program of the virtual vehicle in the virtual scene is written using the Labview and Simulink software. A steering motor in the platform provides active steering torque for simulating changes in the driving intention of the automated driving system.

A driver subject to the test is inside the autonomous vehicle, and the vehicle is made in an autonomous driving state in a certain driving cycle scenario. It is required that the driver's limbs are not in contact with any vehicle motion control mechanism and the driver is in a "capable state", where the "capable state" of the driver is a state that the driver is capable of performing take-over control, and therefore the driver is not in an abnormal state such as coma, asleep, or drunk, and the driver is allowed to perform activities such as reading, talking, and entertainment.

By simulating a vehicle system failure, an autonomous driving system failure, and a state of exceeding a design operating domain, the vehicle entering a faulty state is simulated. When there is no vehicle system take-over request or when there is a vehicle system take-over request, the driver subject to the test requires the vehicle to turn off the autonomous driving system after being in contact with the controlling mechanism for a period of time. The driver subject to the test implements, according to his/her own "capable state", the cooperative control process of the control apparatus with the vehicle system before the autonomous driving system is turned off. After the autonomous driving system is turned off, the driver enters the traditional human driving phase. At this time, the human machine cooperative control process ends, and the driver subject to the test is required to control the vehicle to enter a designated stable driving state.

The vehicle system refers to a vehicle system other than the autonomous driving system, including a mechanical system, an electrical system, etc. that are not related to the normal operation of the autonomous driving system. Therefore, the vehicle system failure refers to failure of a part of a non-autonomous driving system of the vehicle, such as a flat tire, a leakage of brake hydraulic oil, and other faults.

The autonomous vehicle relies on artificial intelligence, visual computing, radar, a monitoring apparatus, and a global positioning system to work together, so that a computer can automatically and safely operates a motor vehicle without any human active operation. Therefore, the autonomous driving system failure refers to a state that the vehicle cannot automatically and safely operate the motor vehicle.

Exceeding the design operating domain means that the vehicle system and the autonomous driving system are normal, but state variables of vehicle driving exceed the design parameter range of the autonomous driving system. In this case, the autonomous driving system can be equivalent to a state that a system failure occurs.

When the vehicle enters a faulty state, it means the vehicle system failure, the autonomous driving system failure, and the state of exceeding the design operating domain.

The vehicle system take-over request refers to all vehicle system signals that can cause audible, visual, and tactile feedback of the driver and have clear take-over requirements. After receiving the vehicle system take-over request, the driver needs to take over a driving task on the basis of his/her own conditions.

The control mechanism refers to all contact-type structures that can provide the driver with vehicle motion control operations.

In the human machine cooperative take-over control process, the driver is in contact with the vehicle motion control mechanism and exerts control force on the control mechanism. At this time, the vehicle system still exerts control force on the control mechanism. Therefore, in this process, the control mechanism is affected by the two control force sources of both the driver and the vehicle system.

The designated stable driving state is a driving state specified by a human, such as a parking state, or a state of continuously driving along a specific lane.

A specific test process is as follows:

Subjects are recruited who are required to be healthy, have no bad habits, have not taken psychotropic drugs in the past six months, and have no damage to the upper limb muscles and nervous system.

The contents and requirements of the test are illustrated and explained to the subjects until the subjects fully understand them; the subjects are assisted in adjusting the driver's seat until the subjects hold the steering wheel horizontally with two hands in the most comfortable natural posture; and the subjects are helped to adjust a position, a height, and an angle of a main screen of a simulator, thereby ensuring that the subjects can easily observe the screen of the simulator.

Before entering the scene, a subject keeps hands on his/her knees in a natural posture, and looks at the main screen of the simulator with both eyes; after entering the scene, the subject continues to watch a driving image generated by the main display of the simulator; after receiving the system take-over request, the subject is immediately in contact with the steering wheel and forms effective control of the steering wheel; the simulator is set to continue to provide an autonomous driving program for 1 second after the subject touches the steering wheel, and then the autonomous driving program is closed; after touching the steering wheel, the subject is required to always control the steering wheel and make the vehicle travel along the center line of the lane; the subject controls the vehicle to travel within a lateral deviation range of 0.5 m for 2s, and then the autonomous driving system re-intervenes; the test is terminated and the subject gives a subjective evaluation result according to the requirements of the questionnaire; and the simulator is reset, the subject takes a break, and data is recorded to prepare for the next test. Every time the test stops, steering wheel angle data recorded by the simulator sensor, steering wheel speed data obtained from differential steering wheel angle data, driver hand torque data, and road curvature information collected by the Labview software. The above process is repeated to form a training data set for model parameter training.

According to subjective evaluation data information acquired in different tests, the subjective evaluation data information is sequentially recorded as $D_{tv1}, D_{tv2}, \ldots, D_{tvm}$; and according to preprocessed vehicle data information acquired in different tests, the preprocessed vehicle data information is sequentially recorded as $D_{td1}, D_{td2}, \ldots, D_{tdm}$, where subjective evaluation data information and preprocessed vehicle data information that are acquired in the same test are in a one-to-one correspondence, data $D_{tvm}$ and data $D_{tdm}$ constitute one sample denoted as $D_m$, and a number of the sample $D_m$ is $S_m$.

The subjective evaluation data information includes several comfort levels; the comfort is divided into n comfort levels, with a comfort data group corresponding to a comfort level being defined as $L_n$; and according to the sample number $S_m$ corresponding to the subjective evaluation data information $D_{tvm}$ in the current comfort data group $L_n$, the preprocessed vehicle data information $D_{tdm}$ corresponding to the sample number $S_m$ is retrieved, and the preprocessed vehicle data information $D_{tdm}$ is allocated to the corresponding comfort data group $L_n$. In this embodiment, the comfort is preferably divided into 10 comfort levels, with level 1 to level 4 being defined as unsatisfied, and level 6 to level 10 being defined as satisfied. Refer to the questionnaire for details.

When a driving cycle of transitioning from the autonomous driving state to the take-over driving state occurs in an actual driving process, the subjective evaluation data information and the vehicle data information are acquired, and the acquired subjective evaluation data information and vehicle data information are updated to the training data set as new training data.

The above training data set is based on steering comfort. The human machine cooperative take-over process involves not only steering operations, but also driving operations such as braking and shifting. Therefore, other handling comfort training data sets can be formed by collecting corresponding data, and model parameters for other handling comfort can be trained according to the training data set and on the basis of the expectation-maximization algorithm. Since acquisition methods of the training data set are the same, details are not described again.

Step 3200: Describe the preprocessed vehicle data information using a Gaussian mixture model to form representation information, and associate the representation information with the subjective evaluation data information to form associated data information at different comfort levels.

Step 3300: Use the associated data information as an input to the comfort model for model training.

Step 3400: In the process of training the comfort model, use different comfort levels as hidden states in the comfort model, and iteratively calculate parameters corresponding to the different comfort levels by using an expectation-maximization algorithm until convergence; and form, according to different parameters that have been trained, comfort models corresponding to the different comfort levels, where a plurality of comfort models form the comfort model library.

The expectation-maximization algorithm is the Baum-Welch algorithm.

One "dimension" in multidimensional Gaussian refers to one feature; and the vehicle data used in the comfort recognition process, such as the steering wheel angle, vehicle speed, and other data, are all considered as features of the vehicle. Then, the characteristics in the vehicle and driver cooperative take-over control process can be expressed in the form of a vector, denoted as:

$$y = \begin{bmatrix} X_1 \\ X_2 \\ \vdots \\ X_n \end{bmatrix}$$

In the test, the vehicle data collected is also represented in the form of a vector, which is called an observation vector, denoted as:

$$O = \begin{bmatrix} O_1 \\ O_2 \\ \vdots \\ O_r \end{bmatrix}$$

where $O_r$ refers to data of an $r^{th}$ feature in this time of observation.

Assuming that the r features in the data vector all obey the normal distribution, a probability density function of r-dimensional Gaussian distribution is as follows:

$$f_{O_1,O_2,\ldots,O_r}(O_1, O_2, \ldots, O_r) = \frac{1}{(2\pi)^{\frac{r}{2}}|\Sigma|^{\frac{r}{2}}} e^{(-\frac{1}{2}(O-\mu)^T \Sigma (O-\mu))}$$

where $\Sigma$ is a covariance matrix of the Gaussian distribution, $\mu$ is a mean vector; and T represents the transpose of a matrix.

For models of different comfort levels, observation data thereof uses the Gaussian mixture model for modeling, which is specifically as follows:

$$b_j(O) = \sum_{m=1}^{M} c_{jm} N\left(O, \mu_{jm}, \sum_{jm}\right), 1 \le j \le N;$$

$$\sum_{m=1}^{M} c_{jm} = 1, 1 \le j \le N;$$

where $c_{jm}$ is a mixture coefficient ($c_{jm} \ge 0$) of an $m^{th}$ multidimensional Gaussian probability density function corresponding to a state of $S_j$ at the observation vector O; $\mu_{jm}$ is a mean vector of the $m^{th}$ multidimensional Gaussian probability density function corresponding to the state of $S_j$ at the observation vector O; and $\Sigma_{jm}$ is a covariance matrix of the $m^{th}$ multidimensional Gaussian probability density function corresponding to the state of $S_j$ at the observation vector O.

The state of $S_j$ is classified according to comfort, that is, a state of comfort and a state of discomfort, and then modeling is performed separately for the state of comfort and the state of discomfort. In other words, separate training is performed using data in different states.

The EM algorithm is used for estimation of the parameters of the model. Specifically, the Baum welch algorithm is used.

Actual data may be scattered, and it is difficult to describe characteristics of the data using one Gaussian model. Therefore, the use of multiple Gaussian density functions to build a linear model is a reasonable assumption for data distribution, that is, a Gaussian mixture model. Therefore, data collected by a sensor at a point in time, under the fitting of the Gaussian mixture model, can be considered as from one sampling from the fitting model.

The EM algorithm is based on the idea of a maximum likelihood function, that is, it can be understood that the result of data sampling corresponds to a case of the highest probability among potential sampling results, and this case is considered the most reasonable. Since a probability distribution function of the multidimensional Gaussian mixture model is difficult to express and difficult to calculate, according to the theory of probability, it can be expressed by its probability density function. Then, seeking the largest probability value using the EM algorithm is equivalent to seeking the maximum of a joint probability density function.

Taking discrete data as an example, specific working steps of the EM algorithm are as follows:

A log-likelihood function of the data is established, where the log-likelihood function is denoted as:

$$\ell(\lambda) = \sum_{t=1}^{T} \log \sum_{q} p(o^{(t)}, q | \lambda)$$

The next function of a likelihood function of parameters in the log-likelihood function formed by the current whole data is established and denoted as:

$$\ell(\lambda) \geq \sum_{l}\sum_{q} X(q)\log\frac{p(o^{(l)}, q|\lambda)}{X(q)} = \sum_{l} ELBO(o^{(l)}|X_l, \lambda)$$

Parameters of the next function are calculated to obtain an estimated value of the parameter in the current iteration step, which is denoted as:

$$\lambda^{(t+1)} = \underset{\lambda^{(t)}}{\mathrm{argmax}} \sum_{l=1}^{T} ELBO(o^{(l)}|X_l, \lambda^{(t)})$$

The estimated value of the current parameter is used to reconstruct the next function, and then a new estimated value of the parameter is calculated until parameter iteration convergence.

The estimation of the parameter using the EM algorithm in conjunction with the Gaussian mixture model may actually be called the Baum-Welch algorithm. Final estimated values of the parameters obtained by the parameter estimation algorithm are as follows:

$$\overline{c}_{jk} = \frac{\sum_{t=1}^{T}\gamma_t(j,k)}{\sum_{t=1}^{T}\sum_{k=1}^{M}\gamma_t(j,k)};$$

$$\overline{\mu}_{jk} = \frac{\sum_{t=1}^{T}\gamma_t(j,k)(O_t)}{\sum_{t=1}^{T}\gamma_t(j,k)};$$

$$\overline{\sum}_{jk} = \frac{\sum_{t=1}^{T}\gamma_t(j,k)(O_t-\mu_{jk})(O_t-\mu_{jk})'}{\sum_{t=1}^{T}\gamma_t(j,k)};$$

where a calculation factor $\gamma_t(j,k)$ is calculated by using a forward algorithm and a backward algorithm.

Taking a discrete hidden Markov model as an example, probability calculation of an observation sequence of the hidden Markov model is performed, and the forward algorithm is used.

In the forward algorithm, a new calculation factor $\alpha$ is actually applied, that is, a forward variable is used for calculation. This calculation factor represents a probability of a segment of observation sequence in a certain state condition, such that a complicated direct calculation process is replaced by accumulation and iterative calculation of factors to avoid repeated calculation steps, thereby reducing an overall calculation amount (a calculation amount of $r^{th}$ iteration is of the order of $O(N^2r)$).

Usually, a forward variable at a moment t and with a hidden state in $S_i$ is denoted as $\alpha_t(i)$, and its expression is as follows:

$$\alpha_t(i) = P(O_1, O_2, \cdots, O_t, q_t = S_i|\lambda) = \frac{P(O_1, O_2, \cdots, O_t, q_t = S_i, \lambda)}{P(\lambda)}$$

A probability of the observation sequence at the current moment t is denoted as:

$$P(O|\lambda) = \sum_{i=1}^{N}\alpha_t(i)$$

For the iteration process of the forward algorithm, the time parameter needs to be updated until t=T (T is a moment of termination). Therefore, considering that a state of the next moment t+1 may come from any state at the previous moment, the forward variable at the current moment t can also be expressed as follows:

$$\alpha_t(i) = \sum_{j=1}^{N}\alpha_{t-1}(j)a_{ji}b_i(k), 2 \leq t \leq T, 1 \leq i \leq N$$

It should be noted that at the initial moment, since there is no observation result at the previous moment, a forward factor in the initial condition still needs to satisfy the formula $$P(O|\lambda) = \sum_{i=1}^{N}\alpha_t(i),$$

that is, satisfy:

$$P(O|\lambda) = \sum_{i=1}^{N}\alpha_1(i) = \sum_{i=1}^{N}\pi_i b_i(O_1)$$

Therefore, an initialization (moment t=1) expression of the forward factor is:

$$\alpha_1(i) = P(O_1, q_t = S_i|\lambda) = \pi_i b_i(O_1), 1 \leq i \leq N$$

Such a probabilistic calculation factor uses the state change direction as an iterative clue to calculate the probability of the observation sequence. Similarly, there is also a method for calculating the probability of the observation sequence with the state change direction iterating from the final moment to the initial moment, which is called a "backward algorithm".

A calculation factor in the backward algorithm is called a backward variable, denoted as $\beta_t(i)$, and its expression is as follows:

$$\beta_t(i) = P(O_{t+1}, O_{t+2}, \cdots, O_T, q_t = S_i|\lambda) = \frac{P(O_{t+1}, O_{t+2}, \cdots, O_T, q_t = S_i, \lambda)}{P(q_t = S_i, \lambda)}$$

It can be found that the backward variable of the backward algorithm describes a joint probability of an observation sequence $O_{t+1}, O_{t+2}, \ldots, O_T$ with $q_t=S_i$ from the moment t+1 to the final moment T.

According to the definition of the backward variable, the probability of the observation sequence can be described as:

$$P(O|\lambda) = \sum_{i=1}^{N} \pi_i b_i(o_1) \beta_1(i)$$

In addition, an iteration expression of the backward variable is as follows:

$$\beta_t(i) = \sum_{j=1}^{N} a_{ij} b_j(O_{t+1})_T \beta_{t+1}(j), 1 \leq i \leq N, 1 \leq t \leq T-1$$

It should be noted that at a moment T−1, the backward variable is:

$$\beta_{T-1}(i) = P(O_T, q_{T-1} = S_i | \lambda) = \sum_{j=1}^{N} a_{ij} b_j(O_T)$$

Therefore, the iterative calculation of the backward variable actually starts at the moment T−1 and terminates at the moment t=1.

The meaning of the calculation factor $\gamma_t(j,k)$ is a probability of the state of $S_k$ in the next moment in the condition that a hidden state at the moment t is $S_j$, and the calculation factor $\gamma_t(j,k)$ is denoted as:

$$\gamma_t(j,k) = \left[\frac{\alpha_t(j)\beta_t(j)}{\sum_{j=1}^{N} \alpha_t(j)\beta_t(j)}\right] \left[\frac{c_{jk} N(O, \mu_{jk}, \sum_{jk})}{\sum_{m=1}^{M} c_{jm} N(O, \mu_{jm}, \sum_{jm})}\right]$$

According to the obtained model, that is, new data obtained, outputs of the model corresponding to different states are calculated; and values of log probabilities are used to determine to which state the current data belongs.

A recognition algorithm that can be supported by the current onboard computer computing performance to perform online calculation is selected. According to the divided comfort levels, an $i^{th}$ model parameter is obtained by using effective training data to train an algorithm, so as to complete the overall modeling of the model.

The present disclosure further provides a path planning method for an autonomous vehicle, which is based on the comfort recognition result described above. The method includes:

Step 101: Determine a recognition degree of operational disturbance and a recognition degree of control disturbance according to the comfort recognition result.

The comfort recognition result is also called a take-over recognition degree, and the take-over recognition degree $sr_{ta}$ includes a user's recognition degree of two types of information in a take-over process, which are the user's recognition degree $ac_{dis}$ of manipulation disturbance (tactile interaction type) transmitted by a vehicle motion control device, and the user's recognition degree $ac_{con}$ of his/her own control (tactile interaction type) ability for vehicle motion after being subject to the manipulation disturbance. For a single user, subjective evaluation he/she can make is a limited set, denoted as $SR_{ta}$, and the set will not exceed a Cartesian product of a finite set $AC_{dis}$ (which can be made by the user for the recognition degree of manipulation disturbance) and a finite set $AC_{con}$ (which can be made by the user for the recognition degree of vehicle motion control), where the Cartesian product is denoted as:

$$SR_{ta} = AC_{dis} \times AC_{con}$$

Step 102: Determine an operational risk and a control risk according to the recognition degree of the operational disturbance and the recognition degree of the control disturbance.

A larger value of the recognition degree $ac_{dis}$ of manipulation disturbance (a higher subjective evaluation rating) indicates that operational disturbance (tactile interaction type) the user thinks in the take-over process is higher. At the same time, the higher the operational disturbance, the higher the corresponding take-over risk. This type of risk is denoted as $r_{dis}$ (called a disturbance risk).

A larger or smaller value of the recognition degree $ac_{con}$ of control disturbance (a higher or lower subjective evaluation rating) indicates that the user's self-recognition of an ability to control the vehicle motion in the take-over process is higher or lower. A higher self-recognition level (self-conceit) or a lower self-recognition level (self-abasement) are considered as two extreme judgments of one's actual ability, and thus there is a cognitive bias. Therefore, a risk corresponding to these two extreme cases is higher. This type of risk is denoted as $r_{con}$ (called a control risk).

Step 103: Determine a take-over risk according to the operational risk and the control risk.

The take-over risk $r_{in}$ is the linear superposition of the disturbance risk $r_{dis}$ and the control risk $r_{con}$, and is also called an internal risk. All possible values of a take-over risk $r_{in}$ of any user in a vehicle are considered as finite, and can form a finite set $R_{in}$, and each element $r_{in}$ in this finite set corresponds to the user's take-over risk in one take-over process.

The take-over risk $r_{in}$ corresponds to a disturbance risk $r_{dis}$ and a control risk $r_{con}$ (in the same take-over process). Then, the take-over risk $r_{in}$ may be described as a risk vector, denoted as:

$$r_{in} = (K_{dis} r_{dis}, K_{con} r_{con})$$

where $K_{dis}$ is a weight coefficient of the disturbance risk, and $K_{con}$ is a weight coefficient of the control risk. The internal risk $r_{in}$ can be expressed as a norm of the take-over risk vector, that is:

$$r_{in} = \|K_{dis} r_{dis}, K_{con} r_{con}\|_1$$

Step 104: Acquire a surrounding environmental risk.

The surrounding environmental (external) risk $r_{out}$ includes two aspects, namely, an external environment except the autonomous vehicle (self-vehicle) and an environment of the autonomous vehicle (self-vehicle) except the driver.

The surrounding environmental (external) risk $r_{out}$ exists in an effective autonomous vehicle observation range R. In a Cartesian coordinate system, with the position of the autonomous vehicle as the origin, a norm ball is formed, that is, the effective observation of the external environment by the autonomous vehicle is within this norm ball, which may be denoted as:

$$B(X_C) = \{X \| X - X_C\| < R\}$$

where $X_C$ is the spatial position (the Cartesian coordinate system) of the autonomous vehicle.

Risk factors of the surrounding environmental (external) risk $r_{out}$ are divided into a hierarchical structure having five layers in total:

risk factors at the lowest layer (sixth layer) are related to weather conditions, including but not limited to factors such as sunny, rain, fog, haze, and wind;

risk factors at the second lowest layer (fifth layer) are related to road conditions and not related to traffic facilities, for example, factors such as a road adhesion coefficient, road curvature, the number of lane lines, crossings, and ramps;

risk factors at the third lowest layer (fourth layer) are road facilities, such as traffic lights, isolation belts, lane markings, and other factors;

risk factors at the third highest layer (third layer) are traffic laws, such as rules that require vehicles to slow down when approaching a crosswalk;

a risk factor at the second highest layer (second layer) is a vehicle subsystem (a system that does not directly interact with a user in a vehicle); and risk factors at the highest layer (first layer) are traffic behavior of surrounding vehicles and pedestrians.

The judgment of a state of any risk factor can be based on existing models (research), agreement (regulations), and related experience. In other words, for different types of risk factors, the state of the risk factor may be judged in combination with relevant expertise or mathematical models in the industry.

The judgment of any risk factor is within the norm ball formed by the observation range R of the autonomous vehicle. In this norm ball, a spatial position of risk intensity provided by a risk factor corresponds to (decides) a real spatial position of the risk factor.

The surrounding environmental (external) risk $r_{out}$ is the superposition of risk intensity provided by risk factors at different layers, and is denoted as:

$$r_{out} = \Sigma K_{li} r_{li}$$

where $r_{li}$ is risk intensity of all risk factors at an $i^{th}$ layer, and $K_{li}$ is a weight factor of this layer.

Risk intensity provided by any risk layer is the superposition of risk intensity of all risk factors at the layer, and is denoted as:

$$r_{li} = \Sigma re_{ij}$$

where $re_{ij}$ is risk intensity of a $j^{th}$ risk factor at the $i^{th}$ layer.

Step 105: Determine a unified risk of the autonomous vehicle based on the take-over risk and the surrounding environmental risk.

At any moment, the unified risk $R_{dri}$ of the self-vehicle is the linear superposition of an in-vehicle user take-over (internal) risk $r_{in}$ and a surrounding environmental (external) risk $r_{out}$, and is denoted as:

$$R_{dri} = K_{r_{out}} r_{out} + K_{r_{in}} r_{in}$$

where $K_{r_{out}}$ and $K_{r_{in}}$ are weight factors for the take-over (internal) risk and the surrounding environmental (external) risk, respectively.

Step 106: Determine, according to the unified risk, a set of points with the lowest risk intensity in path planning for the autonomous vehicle, recording the set of points as an optimal safe trajectory, and redefine a finite set of path points that constitute the optimal safe trajectory, to obtain an optimal path result.

A point (element) $P_{c1}$ in a set $P_c$ at any moment appears on an intersection curve between a boundary of a norm ball with the current position X of the self-vehicle as the origin and $R_m$ as a distance and a road surface. In addition, it is specified that:

$$R_m = v \cdot c$$

where c is a moving range factor, and v is a scalar of the current vehicle speed. Then, a set $P_{c1c}$ about $P_{c1}$ can be obtained and denoted as:

$$P_{c1c} = \{X_P \mid \|X - X_P\| = vc\} \cap \{\text{road sueface points}\}$$

A point (set) with the lowest risk intensity needs to be found in the set $P_{c1c}$, and this point (set) is $P_{c1}$ and is expressed as:

$$P_{c1} = \text{argmin}\{rp_{c1c}\}$$

where $\{rp_{c1c}\}$ is a set of risk intensity of each element in the set $P_{c1c}$, and it should be noted herein that $P_{c1}$ may be a set of multiple points, that is, a non-single point set.

After $P_{c1}$ has been planned, $P_{c1}$ is used as a new X point (set), and the above steps are repeated to obtain $P_{c2}$. Iterative calculation is performed in this way to obtain a new point (set). To prevent a single location point in the planned point (set) calculated in the next iteration from "turning back" in space, a spatial coordinate parameter of each coordinate point is considered as a vector, and some currently planned path points are required to be excluded. These points in each component will be less than or equal to a component value of any point in the previous iteration.

Iterative calculation is performed until the path points "stagnate" in space, (that is, the distance between the planned path points is very small, so that the position of the vehicle in space does not change significantly), that is, arbitrary values $\delta$ and $N_P$ are given to make:

$$\|P_{cn}, P_{cn+Np}\|_1 < \delta$$

In this case, only $P_{cn}$ is reserved as a final planning result, that is, planning results of $P_{cn+1}$ to $P_{cn+Np}$ are discarded.

For all the final planning results, $P_{c1}$ to $P_{cn}$, a set consisting of all the points is defined as $P_c$. Then, all possible path are formed by these path points. Once again, any path point is considered as a vector. To present a planned path from turning back, it is also required that a vector component of a path point reached in the next iterative calculation is always greater than that of any path point reached in the previous planning Finally, these planning points that meet the component requirements may be connected, and multiple paths are formed, so as to select a path that meets the actual target requirements, thereby achieve path planning work.

An optimal safe trajectory is determined and denoted as $\zeta$, and a finite set of path points constituting the path $\zeta$ is redefined and denoted as $P\zeta(p_1, \ldots, p_m)$. In addition, a current trajectory formed by the motion of the self-vehicle is defined and denoted as ξ. However, the trajectory is actually formed by a finite number of points, and therefore it is necessary to fit the finite set by using a fifth-degree polynomial method, to obtain a continuous trajectory function, which is denoted as $\xi_c$.

The planned optimal safe trajectory ζ is considered as a desired trajectory, and a front wheel angle θ needs to be controlled (assuming that the vehicle is a front-wheel steering vehicle), to make the self-vehicle trajectory ξ approach the optimal safe trajectory ζ. A path error ε is defined, ε=|ζ−ξ|, and a step size of each error observation is denoted as $T_r$.

Step 107: Control a front wheel turning angle of the vehicle according to the optimal path result, to implement intelligent vehicle path planning work based on the takeover risk of autonomous driving.

After the error ε is observed, a PID controller is used, and the front wheel angle of the vehicle is used as a control quantity. Within one step size T, it is desired that the vehicle can use a PID controller to obtain a front wheel angle change amount Δθ according to an error ε observed at the beginning phase of this step size $T_r$. This front wheel angle change amount Δθ causes the vehicle gradually reduce ε within T, so that the vehicle is constantly approaching the optimal safe trajectory ζ. The control relationship formula is:

$$\Delta\theta = K_p \Box \varepsilon + K_i \Box \int \varepsilon \Box dt + K_d \Box (d\varepsilon/dt)$$

where $K^p$ is a proportional term coefficient of the PID controller, $K_i$ is an integral term coefficient of the PID controller, $K_d$ is a differential term coefficient of the PID controller.

An embodiment of the present disclosure provides a computer-readable storage medium, including a program that, when loaded and executed by a processor, can implement the steps described in the procedures of FIGS. 1 and 2.

The computer-readable storage medium includes any medium that can store program code, such as a USB flash drive, a removable hard disk, a read-only memory (ROM), a random access memory (RAM), a magnetic disk, or an optical disc.

Figure 3:
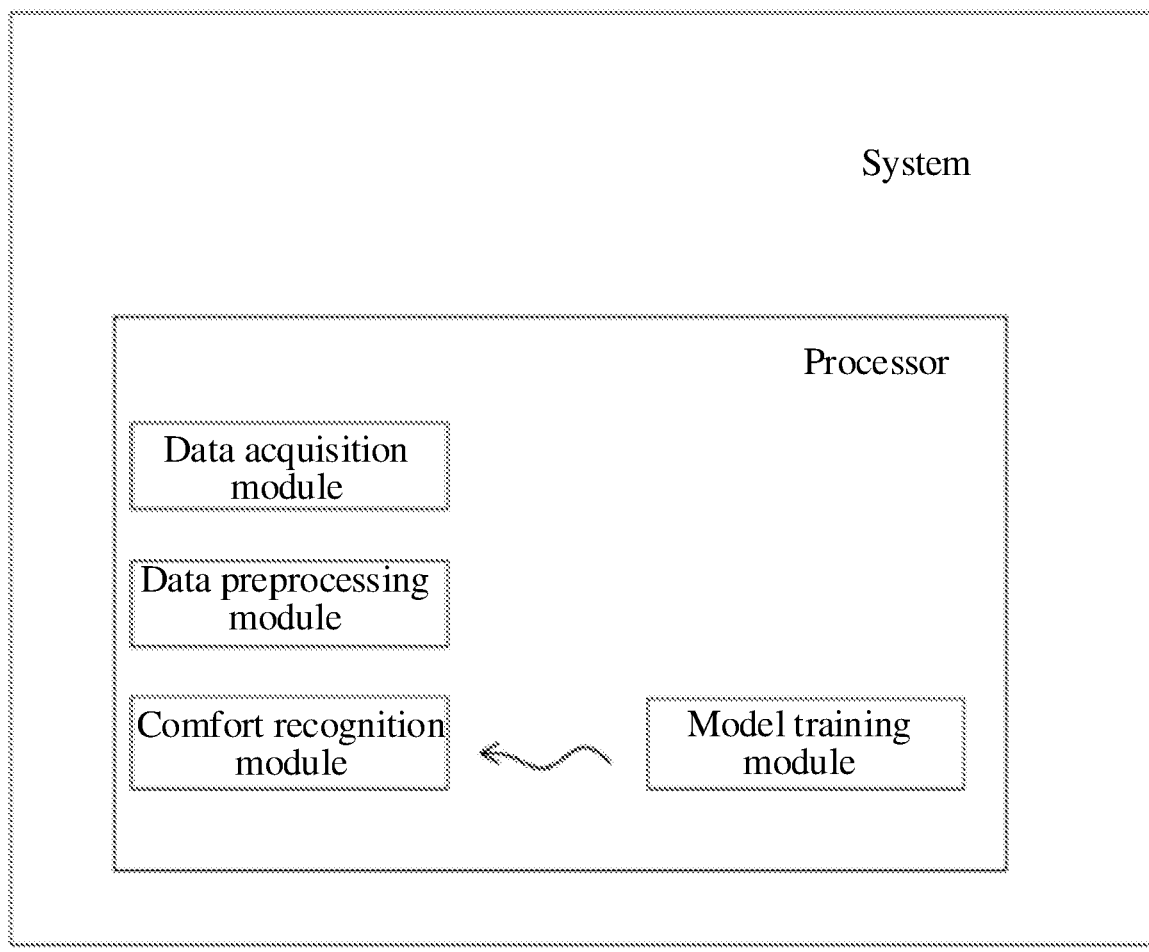
FIG. 3 is a schematic structural diagram of an evaluation system for steering comfort in a human machine cooperative take-over control process of an autonomous vehicle.

Based on the same inventive concept, an embodiment of the present disclosure provides an evaluation system for steering comfort in a human machine cooperative take-over control process of an autonomous vehicle, as shown in FIG. 3, including a memory, a processor, and a program storing on the memory and capable of running on the processor, where the program, when loaded and executed by the processor, can implement the evaluation method for steering comfort in a human machine cooperative take-over control process of an autonomous vehicle described in the procedures of FIGS. 1 and 2.

The processor includes:
a data acquisition module configured to acquire vehicle data information collected by a control mechanism sensor and a vehicle sensor in a current driving cycle;
a data preprocessing module configured to preprocess the vehicle data information to form preprocessed vehicle data information;
a comfort recognition module configured to use the preprocessed vehicle data information as an input to a well-trained hidden Markov model, and estimate model parameters of the hidden Markov model to form maximum likelihood estimation information; and perform log probability matching calculation on the basis of the maximum likelihood estimation information and the trained comfort model library, to form a comfort recognition result;
a model training module for describing the preprocessed vehicle data information using a Gaussian mixture model to form representation information, and associating the representation information with the subjective evaluation data information to form associated data information at different comfort levels; using the associated data information as an input to the hidden Markov model for model training; and in the process of training the hidden Markov model, modeling different comfort levels by using the expectation-maximization algorithm, to continuously calculate observed values and estimated values, until the hidden Markov model converges to obtain a final hidden Markov model.

Those skilled in the art can clearly understand that, for convenience and conciseness of description, only the division of the foregoing function modules is used as an example. In practical applications, the foregoing functions may be allocated to and completed by different function modules as required, that is, an internal structure of the apparatus is divided into different function modules to complete all or some of the functions described above. For a specific working process of the system, apparatus, and unit described above, refer to the corresponding process in the foregoing method embodiments. Details are not described herein again.

In several embodiments provided herein, it should be understood that the disclosed system, apparatus, and method may be implemented in other manners. For example, the described apparatus embodiment is merely an example. For example, the module or unit division is merely a logical function division, and there may be may be other division manners in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit. The above integrated unit may be implemented either in the form of hardware or in the form of software functional units.

The integrated unit, if implemented in the form of a software functional unit and sold or used as a stand-alone product, may be stored in a computer-readable storage medium. Based on this understanding, the technical solutions of the present application, in essence or the part contributing to the prior art, or some or all of the technical solutions may be embodied in a form of a software product. The computer software product is stored on a storage medium, and includes several instructions to cause a computer device (which may be a personal computer, a server, or a network device) to perform all or some steps of the methods according to the embodiments of the present application. The foregoing storage medium includes any medium that can store program code, such as a USB flash drive, a removable hard disk, a read-only memory, a random access memory, a magnetic disk, or an optical disc.

The embodiments described above are merely intended to describe the technical solutions of the present application in detail, but the description of the foregoing embodiments is merely intended to facilitate an understanding of the method of the present disclosure and the core idea thereof, and shall not be construed as a limitation to the present disclosure. Any variation or replacement readily figured out by a person skilled in the art within the technical scope disclosed in the present disclosure shall fall within the scope of protection of the present disclosure.

What is claimed is:

1. A method for steering comfort in a human machine cooperative take-over control process of an autonomous vehicle, comprising:
   acquiring vehicle data information collected by control mechanism sensors and vehicle sensors in a current driving cycle, and preprocessing the vehicle data information to form preprocessed vehicle data information;
   selecting a training data set of a comfort model, wherein the training data set comprises subjective evaluation data information and the preprocessed vehicle data information, with the preprocessed vehicle data information being in a one-to-one correspondence with the subjective evaluation data information; and the subjective evaluation data information comprises several comfort levels;
   describing the preprocessed vehicle data information using a Gaussian mixture model to form representation information, and associating the representation information with the subjective evaluation data information to form associated data information at different comfort levels;
   using the associated data information as an input to the comfort model for model training;
   in the process of training the comfort model, using different comfort levels as hidden states in the comfort model, and iteratively calculating parameters corresponding to the different comfort levels by using an expectation-maximization algorithm until convergence;
   forming, according to different parameters that have been trained, comfort models corresponding to the different comfort levels, wherein a plurality of comfort models form a comfort model library;
   using the preprocessed vehicle data information as an input to the comfort model library, and generating a comfort recognition result corresponding to comfort by performing log probability matching calculation on the basis of the comfort model library;
   determining a recognition degree of operational disturbance based on a driver's tactile interaction with the autonomous vehicle and a recognition degree of control disturbance based on the driver's recognition of control;
   determining a control risk according to the recognition degree of the operational disturbance and the recognition degree of the control disturbance;
   determining a take-over risk according to the control risk;
   acquiring a surrounding environmental risk;
   determining a unified risk of the autonomous vehicle based on the take-over risk and the surrounding environment risk;
   determining, according to the unified risk, a set of points with the lowest risk intensity in path planning for the autonomous vehicle, recording the set of points as an optimal safe trajectory, and redefining a finite set of path points that constitute the optimal safe trajectory, to obtain an optimal path result; and
   planning an intelligent vehicle path based on the unified risk of autonomous driving by controlling a front wheel turning angle of the vehicle according to the optimal path result.

2. The method according to claim 1, wherein the current driving cycle is a transition from an autonomous driving state to a take-over driving state.

3. The method according to claim 2, wherein the autonomous driving state is defined as a state that a driver is inside the autonomous vehicle and the limbs of the driver are not in contact with any vehicle motion control mechanism; and
   the take-over driving state is defined as a human machine cooperative control state that is formed by both an autonomous driving system and a driver who is inside the autonomous vehicle after the autonomous driving system sends a take-over request to the driver and before the vehicle motion control of the autonomous driving system fails.

4. The method according to claim 1, wherein a method for selecting the subjective evaluation data information and the preprocessed vehicle data information in the training data set is as follows:
   acquiring, according to the current driving cycle and a predesigned handling comfort evaluation questionnaire, subjective evaluation data information corresponding to a handling comfort evaluation survey in the current driving cycle, and sequentially recording, according to subjective evaluation data information acquired in different tests, the subjective evaluation data information as $D_{tv1}, D_{tv2}, \ldots, D_{tvm}$; and
   acquiring the vehicle data information collected by the control mechanism sensors and the vehicle sensors in the current driving cycle, and preprocessing the vehicle data information to form the preprocessed vehicle data information, and sequentially recording, according to preprocessed vehicle data information acquired in different tests, the preprocessed vehicle data information as $D_{td1}, D_{td2}, \ldots, D_{tdm}$, wherein
   subjective evaluation data information and preprocessed vehicle data information that are acquired in the same test are in a one-to-one correspondence, data $D_{tvm}$ and data $D_{tdm}$ constitute one sample denoted as $D_m$, and a number of the sample $D_m$ is $S_m$.

5. The method according to claim 1, further comprising: dividing the comfort into n comfort levels, with a comfort data group corresponding to a comfort level being defined as $L_n$; and retrieving, according to the sample number $S_m$ corresponding to the subjective evaluation data information $D_{tvm}$ in the current comfort data group $L_n$, the preprocessed vehicle data information $D_{tdm}$ corresponding to the sample number $S_m$, and allocating the preprocessed vehicle data information $D_{tdm}$ to the corresponding comfort data group $L_n$.

6. The method according to claim 5, further comprising: when a driving cycle of transitioning from the autonomous driving state to the take-over driving state occurs in an actual driving process, acquiring the subjective evaluation data information and the vehicle data information, and updating the acquired subjective evaluation data information and vehicle data information to the training data set as new training data.

7. The method according to claim 1, wherein the comfort model library comprises a comfort state model and a non-comfort state model; and values of log probabilities of the comfort state model and the non-comfort state model are calculated according to a forward-backward algorithm, and the comfort recognition result is output according to the values of the log probabilities.

8. A system machine cooperative take-over control process of an autonomous vehicle, comprising:
   at least one processor; and
   a memory storing instructions that, when executed by the at least one processor, cause the at least one processor to execute operations comprising:
   acquiring vehicle data information collected by control mechanism sensors and vehicle sensors in a current driving cycle;
   processing the vehicle data information to form preprocessed vehicle data information;
   selecting a training data set of a comfort model, wherein the training data set comprises subjective evaluation data information and the preprocessed vehicle data information; describing the preprocessed vehicle data information using a Gaussian mixture model to form representation information, and associating the representation information with the subjective evaluation data information to form associated data information at different comfort levels; using the associated data information as an input to the comfort model for model training; in the process of training the comfort model, using different comfort levels as hidden states in the comfort model, and iteratively calculating parameters corresponding to the different comfort levels by using an expectation-maximization algorithm until convergence; and forming, according to different parameters that have been trained, comfort models corresponding to the different comfort levels, wherein a plurality of comfort models form a comfort model library;
   using the preprocessed vehicle data information as an input to the comfort model library, and generating a comfort recognition result corresponding to comfort by performing log probability matching calculation on the basis of the comfort model library;
   determining a recognition degree of operational disturbance based on a driver's tactile interaction with the autonomous vehicle and a recognition degree of control disturbance based on the driver's recognition of control;
   determining a control risk according to the recognition degree of the operational disturbance and the recognition degree of the control disturbance;
   determining a take-over risk according to the control risk;
   acquiring a surrounding environmental risk;
   determining a unified risk of the autonomous vehicle based on the take-over risk and the surrounding environment risk;
   determining, according to the unified risk, a set of points with the lowest risk intensity in path planning for the autonomous vehicle, recording the set of points as an optimal safe trajectory, and redefining a finite set of path points that constitute the optimal safe trajectory, to obtain an optimal path result; and
   planning an intelligent vehicle path based on the unified risk of autonomous driving by controlling a front wheel turning angle of the vehicle according to the optimal path result.

* * * * *